United States Patent [19]
Sato

[11] 3,902,588
[45] Sept. 2, 1975

[54] DIRECTION CHANGING ROLLER CONVEYOR

[75] Inventor: Zensiro Sato, Hiratsuka, Japan

[73] Assignee: The Yokohoma Rubber Co. Ltd., Tokyo, Japan

[22] Filed: July 30, 1973

[21] Appl. No.: 384,361

[30] Foreign Application Priority Data
Sept. 19, 1972 Japan.............................. 47-93227

[52] U.S. Cl......................... 198/127 R; 193/35 MD
[51] Int. Cl............................................. B65g 13/02
[58] Field of Search....... 198/127 R, 33 AB, 32, 75, 198/105; 193/35 MD

[56] References Cited
UNITED STATES PATENTS

| | | | |
|---|---|---|---|
| 3,174,613 | 3/1965 | Insolio............................ | 198/127 R |
| 3,268,059 | 8/1966 | Hill................................ | 198/127 R |
| 3,355,006 | 11/1967 | Heilbrunn........................ | 198/105 |
| 3,567,002 | 3/1971 | Russ.............................. | 198/127 R |

Primary Examiner—Richard A. Schacher
Assistant Examiner—Jeffrey V. Nase
Attorney, Agent, or Firm—Bruce K. Thomas

[57] ABSTRACT

A conveyor adapted to change the direction of an article being transferred thereon, said conveyor being of the construction including a first linear transfer portion having a plurality of parallel rollers, a direction changing portion which is located adjacent to said first transfer portion and adapted to change the direction of an article being transferred, and a second linear transfer portion also having a plurality of parallel rollers, said direction changing portion consisting of a combination of at least one group of parallel rollers having varying lengths and at least one single separate roller extending along the line formed with the ends, on one side, of said at least one group of parallel rollers, said line being formed at a given angle to rollers of said first linear transfer portion, said group of parallel rollers and said single separate roller being adapted to be driven by a drive means. This conveyor permits the directional change of an article being transferred with a minimized space and without imparting a downward gradient to at least said direction changing portion in a level plane.

4 Claims, 19 Drawing Figures

Fig. 12
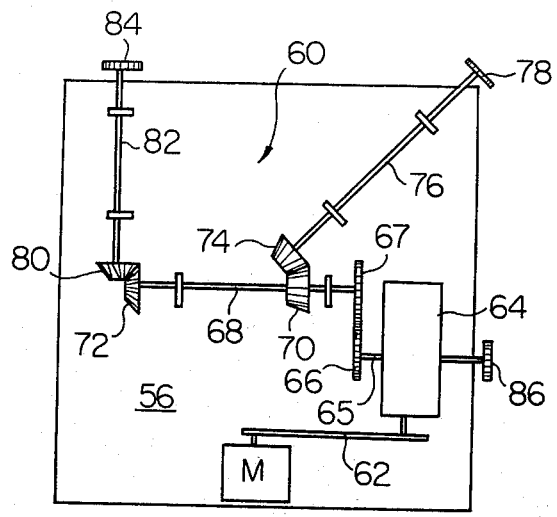
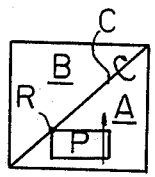 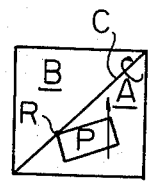 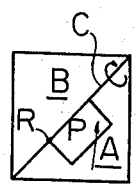 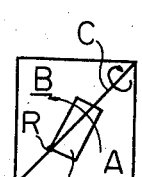 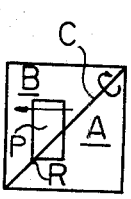
Fig.13a   Fig.13b   Fig.13c   Fig.13d   Fig.13e

DIRECTION CHANGING ROLLER CONVEYOR

BACKGROUND OF THE INVENTION

1. Field of the Invention

This invention relates to a roller conveyor for use in transferring an article, and more particularly to a conveyor adapted to permit the directional change of said article in a level plane.

2. Description of the Prior Art

A linear transfer conveyor having a plurality of rollers arranged transversely in a desired advancing direction of an article to be transferred has a wide application for transferring articles such as raw materials, manufactured goods and products from one place to another in a plant or a warehouse. A conveyor of this type is simple in construction and easy in handling such as removal or displacement from one place to another, and particularly affords the most efficient means to transfer articles along a linear path.

However, there often arises a need to change the direction of articles being transferred. Furthermore, to meet such a need, consideration should be taken to efficiently utilize the space, in which to place such a conveyor, in the light of the arrangement of production lines and processing routes of products to be transferred. It follows then that there results in such a need which requires an efficient direction changing means adapted to change the direction of an article at a specific point on a transferring route of an article. In other words, it is desired to have a conveyor of a mechanism which can achieve such purposes with a minimized space and in an efficient manner.

Conventionally, so-called a curved-path conveyor has found such an application, in which it is placed at a direction changing point and used in combination with other linear conveyors. More particularly, this sort of direction changing mechanism or conveyor provides a curved transfer route in a portion between the leading and trailing linear transfer portions of a conveyor. In general, the curved transfer portion of a conveyor consists of a plurality of rollers extending radially, i.e., toward the common center of the inner and outer concentric circular arcs which define the curved transfer route. It is a common practice in such an application to provide such a curved transfer route with a radius about twice the width of a linear transfer portion. In addition to this, a row of a plurality of rollers forming the curved transfer route has a slope of a negative gradient with respect to the advancing direction of an article in a manner to permit the self-shifting of the article. On the other hand, an article which has been running downstream on a linear transfer route will be subjected, on the curved transfer route, to a centrifugal force acting in a radial direction of the outer concentric circular arc, and thus it tends to run off the advancing route. Accordingly, to insure the positive, undisturbed and safe directional change of an article on such a curved transfer route, there arises a necessity to empirically adjust and determine the factors such as the heights of the aforesaid inner and outer circular arcs, diameters of rollers used, spacing between each adjacent rollers and downward gradients of routes, plus the complicated relationship of the properties and weights of articles being transferred to the aforesaid factors.

Nevertheless, such a conventional mechanism has suffered from many shortcomings which follow:

i. For achieving a safe and smooth transfer of articles, the radius of a curved route should be at least two times the width of a linear transfer route, thus resulting in dead spaces and the spaces required for inclining transfer routes, with the resultant failure in effectively utilizing spaces in a plant or a warehouse.

ii. The downward gradient of the curved route should be increased to insure the positive shifting of an article by 30 to 40% as compared with that of the linear route. However, such a downward gradient is not a solution, nor has bearing on the unwanted centrifugal force acting on an article being transferred, in addition to the factors such as the length of a route, inclined angle of rollers, properties and weight of the article, thus being still suffered from stagnation of goods or articles on the curved transfer route of a conveyor.

It is accordingly a principal object of the present invention to provide a conveyor which can avoid the aforesaid shortcomings by presenting a direction changing mechanism which permits the directional change of article within a minimized area as well as which can provide a safe and smooth transfer of an article on the direction changing portion of a conveyor.

It is a further object of the invention to provide a conveyor which permits the directional change of an article in a level plane with the aid of a drive mechanism.

SUMMARY OF THE INVENTION

It has been found that the foregoing and related objects can readily be attained in a conveyor which comprises a first and second linear transfer portions having a plurality of driving or alternative idle rollers and a direction changing portion placed between said first and second linear transfer portions, said direction changing portion consisting of at least one combination of a group of a plurality of parallel rollers having gradually varying lengths in a transfer direction of an article and a single separate roller, all of which are driven by means of a drive mechanism. The single separate roller, for instance, extends along the line formed with the ends, on one side, of said group of a plurality of parallel rollers, said line extending at a given angle to rollers in said first linear transfer portion. The conveyor according to the present invention features the arrangement of a direction changing portion, in which the rollers included therein are all positioned in a level plane and, in addition, the advancing direction of an article may be changed by utilizing the braking force acting on an article and the slippage of said article on rollers due to a combination of driving forces of said group of a plurality of parallel rollers and said single separate roller plus the angular arrangement of said group of rollers or said single separate roller therebetween.

Accordingly, the selection of the arrangement of said group of a plurality of parallel rollers and said single separate roller, i.e., the angle between the two directions of the two types of said rollers included in the direction changing portion will permit a desired change in the direction of an article being transferred. In addition, in case the rollers in the first and second linear transfer portions are driven, the entire automated directional change of an article may be effected without providing a downward gradient to the two linear transfer portions and, in such a case, the entire routes may be positioned in a common level plane.

BRIEF DESCRIPTION OF THE DRAWINGS

FIG. 12 is a plan view as viewed along the line 12 — 11 of FIG. 11; and

FIGS. 13a to 13e are examples of an outline showing phases of an article being turned in the direction changing portion of a conveyor of the invention.

DESCRIPTION OF THE PREFERRED EMBODIMENTS

Figure 1A:
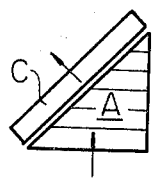
FIGS. 1a, 1b and 1c are examples of an outline showing the basic or elementary combination of the rollers constituting the direction changing portion of a conveyor of the present invention.
Figure 1B:
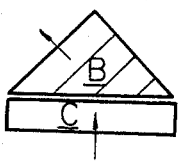
Figure 1C:
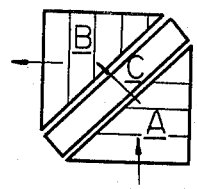

Referring now to FIG. 1, there is shown a direction changing portion of the present invention, which consists of at least two components, i.e., driving roller group A or B, and a single separate driving roller C, the latter of which is placed at an angle of 45° to the rollers included in each driving roller group. FIG. 1(a) shows a combination of the driving roller group A and the single roller C, FIG. 1(b) shows a combination of the driving roller group B and roller C, and FIG. 1(c) shows a combination of the driving roller groups A and B and the single roller C, with the roller C being interposed between the two groups A and B. The combination as shown in FIGS. 1(a) and 1(b) are used for changing the direction of an article being transferred through an angle of 45°, while the combination as shown in FIG. 1(c) is used for changing the direction of an article being transferred through an angle of 90°. The various combinations of driving roller groups A and B, and a single separate roller C may present the directional changes through desired angles.

The direction changing portion of the conveyor is located at a place where the directional change of the article is desired, with the leading and trailing linear transfer portions of the conveyor being placed in the front and rear of said direction changing portion, respectively. FIGS. 2 to 10 represent various arrangements of the roller groups and a single separate roller or rollers included in the direction changing portion in connection to the linear transfer portions $F_1$ and $F_2$ thereby presenting various examples used for directional changes of articles being transferred.

Figure 2:
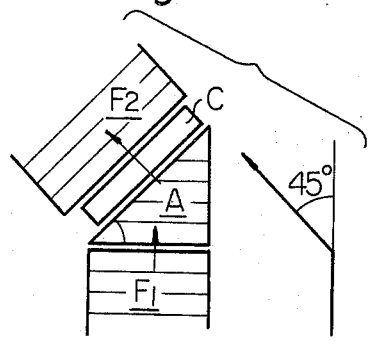
FIGS. 2 to 10 are examples of various combinations of a group of rollers of the type described as well as a single separate roller included in the direction changing portion of the invention to thereby enable various directional changes of an article being transferred.
Figure 3:
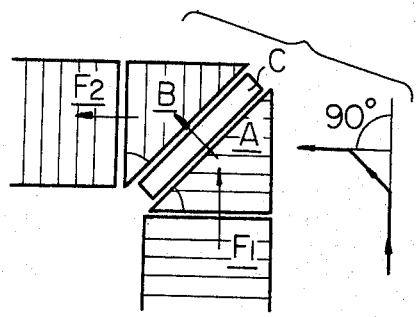
Figure 4:
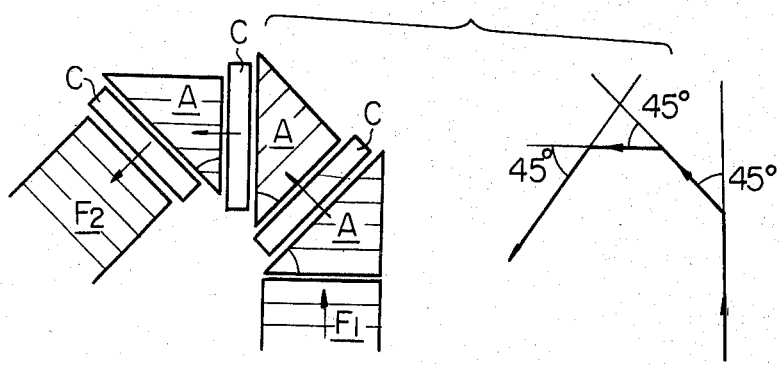
Figure 5:
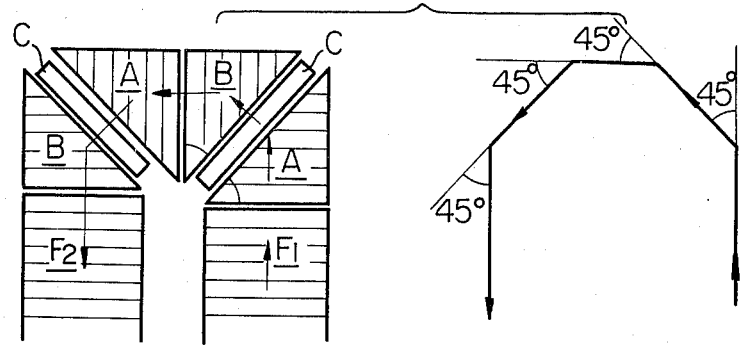
Figure 6:
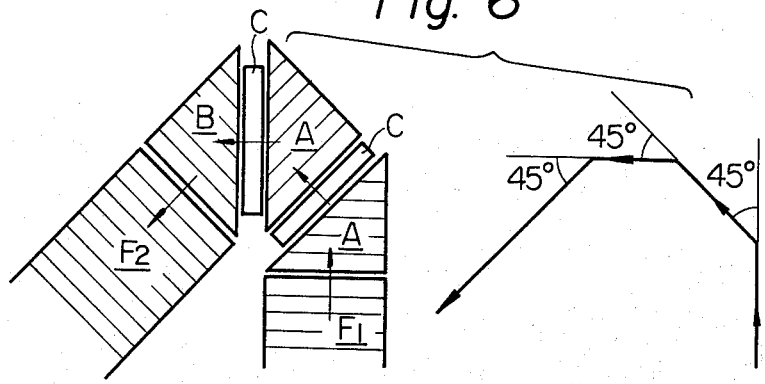
Figure 7:
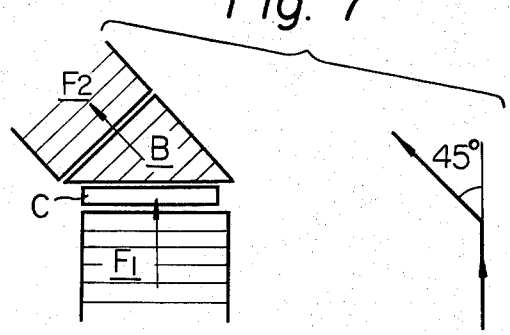
Figure 8:
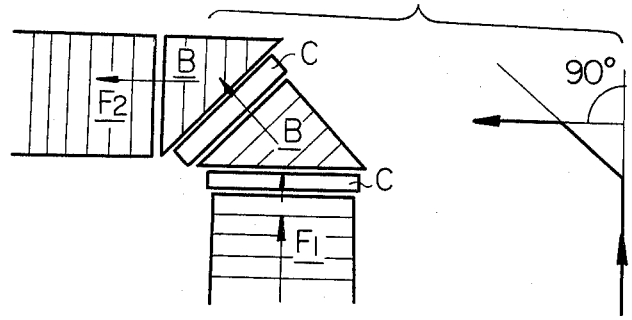
Figure 9:
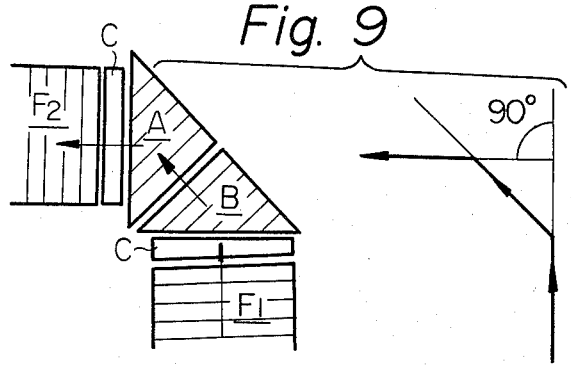
Figure 10:
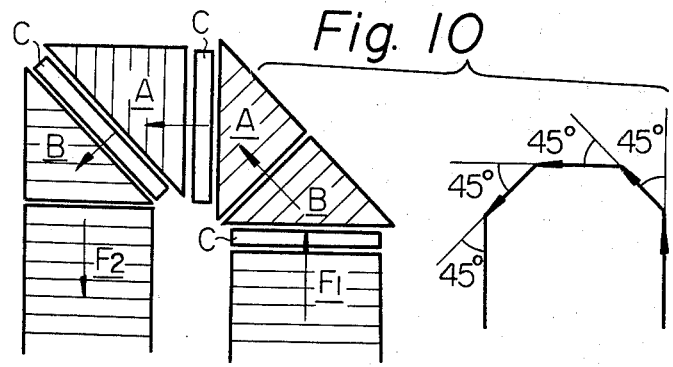

Examples as whown in FIGS. 2 and 3 represent the directional changes through angles of 45° and 90°, respectively, by using the basic or elementary combinations as shown in FIGS. 1(a) and 1(c) with associated linear transfer portions $F_1$ and $F_2$. FIG. 4 shows an example where there is provided a directional change through an angle of 135° by using three sets of an elementary combination as shown in FIG. 1(a). FIG. 5 shows an example where there is provided a directional change through an angle of 180°, i.e., so called "U" turn by using two sets of elementary combinations as shown in FIG. 1(c). Furthermore, FIG. 6 represents an example where there is provided a directional change through an angle of 135° by using two sets of combinations as shown in FIGS. 1(a) and 1(c). Still furthermore, FIG. 7 shows an example where there is provided a directional change through an angle of 45° by using an elementary combination as shown in FIG. 1(b), while FIG. 8 refers to a directional change through an angle of 90° by using two sets of combinations as shown in FIG. 1(b). Yet furthermore, FIG. 9 represents an example where there is provided a directional change through an angle of 90° by using two sets of elementary combinations as shown in FIGS. 1(b) and 1(a). Furthermore, FIG. 10 shows an example where there is provided a directional change through an angle of 180°, i.e., a "U" turn by using three sets of combinations as shown in FIGS. 1(b), 1(a) and 1(c).

As can be seen from the foregoing examples, the direction changing portion of the present invention can present various directional changes of an article being transferred by using elementary combinations as shown in FIGS. 2 to 10. However, further detailed description will be given to the direction changing portion of the invention with reference to FIGS. 11, 1(c) and 3.

Figure 11:
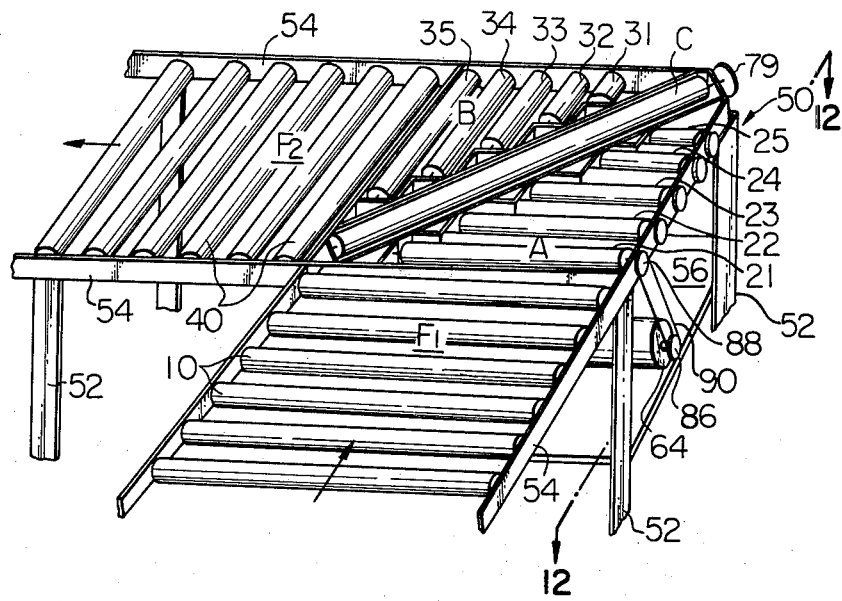
FIG. 11 is a perspective view of a conveyor of the present invention using a basic or elementary combination of FIG. 1.

Referring to FIG. 11, there is shown an arrangement of the conveyor of the present invention, said conveyor consisting of a driving roller group A, a single separate driving roller C, and a driving roller group B, plus two linear transfer portions $F_1$ and $F_2$, each group having a plurality of parallel rollers. More particularly, the direction changing portion having a plurality of rollers is located, as stated earlier, adjacent to each of said two linear transfer portions $F_1$ and $F_2$, thereby constituting a conveyor of the invention.

The roller group A consists of a plurality of driving rollers 21 to 25 parallel to the rollers 10 in the first or trailing linear transfer portion $F_1$, said driving rollers 21 to 25 having gradually decreasing lengths in the article-transferring direction of the first transfer portion $F_1$. Accordingly, in the direction changing portion, the roller 21 nearest to the rollers 10 is longest and the roller 25 furthermost from the rollers 10 is shortest. The ends of the rollers 21 and 25 on one side are aligned with one outer side line formed by the ends of the rollers forming the first linear fransfer portion $F_1$. The ends of the rollers 21 to 25 on the other side are out of alighnment with the other outer side line formed by the ends of the rollers included in said first linear transfer portion $F_1$, but form a line which is at an angle of 135° to said other outer side line measured in a clock-wise direction. The single separate roller C is located parallel to but along the line formed with the other ends of the rollers 21 to 25. As a result, the roller C extends in a direction at a given angle to the rollers of the roller group A, as shown in FIG. 11. The aforesaid angle, however, is governed by the varying rate in lengths of rollers included in the roller group A.

As shown in FIG. 11, in case the roller group B is located adjacent to the roller C, the directional change through an angle of 90° is effected by the combination in a manner as shown in FIG. 3. The roller group B consists, like the roller group A, of a plurality of driving rollers 31 to 35 having different lengths. However, it should be recognized that the lengths of rollers included in the roller group B are gradually increased in the advancing direction of the article. The second or leading linear transfer portion $F_2$ having a plurality of rollers is located adjacent to the roller group B.

In passing, if the elementary combination as shown in FIG. 1(b) is desired, the roller C may be located parallel to the rollers 10 of the first linear transfer portion F, as shown in FIGS. 7, 8, 9 and 10.

On the other hand, the second or leading transfer portion $F_2$ may be provided adjacent to the single separate roller C, as shown in FIGS. 2, 4 and 9.

The change in the direction of the article being transferred is effected by means of a combination of a braking force and slippage, i.e., by the combination of the force to advance the article forward and the force to change the direction of said article, the former being imparted to said article by means of rollers of the roller group A, while the latter is given by means of the single separate roller C. The drive mechanism of the rollers will now be described with reference to FIGS. 11 and 12.

As shown in FIG. 11, the rollers of two linear transfer portions $F_1$ and $F_2$ and those of the direction changing portion are supported on a single frame 50. The frame 50 includes a plurality of supports 52, side plates 54, in which there are provided bearings for use with the rollers, and a bottom plate 56 provided on the underside of the direction changing portion. Mounted on the bottom plate 56 is a motor M which is adapted to drive the roller groups A and B as well as the single separate roller C, with the roller groups A and B plus the roller C are all driven through power transmission mechanism 60 as shown in FIG. 12 by means of said motor M.

The motor M is connected through a belt 62 to a reduction gear means 64, which is adapted to transmit the rotational force from the motor M to a shaft 68 through gears 66 and 67 provided in a meshing relation thereto, said gear 66 being journaled on a shaft 65 at its one end. The shaft 68 mounts thereon two bevel gears 70 and 72, the rotations of which are transmitted through a bevel gear 74 meshing with the bevel gear 70, to a sprocket 78 on one hand, and through a bevel gear 80 meshing with the bevel gear 72, to a sprocket 84 journaled on a shaft 82 on its end on the other. An additional sprocket 86 is provided on the shaft 65 on the other end thereof.

The sprockets 78, 84 and 86 are operatively connected with the roller C, roller groups B and A respectively. In other words, the sprocket 86 is connected through a chain 90 to the sprocket 88 secured on the end of roller 21 of the roller group A to thereby drive the rollers of the roller group A. Journaled on each end of the driving rollers are sprockets similar in construction to the sprocket 88, those sprockets being operatively connected with each other by means of a chain which is trained around said sprockets, whereby when the roller 21 is rotated through the sprocket 86 and the chain 90, the other rollers 22 to 25 are rotated therewith. Likewise, the roller C is driven through sprocket 79 and, on the other hand, the rollers in the roller group B are driven through sprocket 84 and sprockets (not shown) similar to the sprockets 88 and 79.

Although the rollers 10 and 40 of the two linear transfer portions $F_1$ and $F_2$ have been described as being idle rollers or non-driven rollers, such rollers may be driven by means of the mechanism as has been described thus far. With this arrangement, it is not necessary to impart a downward gradient to the linear transfer portions, thereby enabling the transfer of an article in a common level plane. On the other hand, although rollers 10 and 40 of the linear transfer portions and rollers of the direction changing portion are all supported on a single frame 50, the rollers of the direction changing portion may be supported on an independent frame, on which there is mounted a drive means for use in changing the direction of an article.

The transmission mechanism as shown in FIG. 12 is adapted to cause the roller C and rollers of the roller groups A an B to rotate at the same R.P.M. and in the same direction, whereby the directional change of an article may be accomplished as shown in FIG. 13.

When an article P which has been transferred on the trailing linear transfer portion enters the direction changing portion, part of the article P will abut the roller C at a point R, as shown in FIG. 13(a). However, partly because the remaining part of the article P rests on the rollers of the roller group A and partly because there remains inertia of the article P, the article P tends to advance toward the direction shown by an arrow. On the other hand, the rotation of the roller C will impart a braking force at a point R to the movement of the article in a direction as shown, whereby the article P is gradually turned about the point R with slippage on the rollers of the roller group A as shown in FIG. 13(b), eventually assuming the position on and parallel to the roller C as shown in FIG. 13(c). The article P on the roller C tends to advance by means of the rotating roller C and the rollers of the roller group B.

On the other hand, due to the angular arrangement of the rollers of the roller group B to the roller C, the rotation of the roller C will impart a braking force to the article P at the point R, while the rollers of the roller group B tend to transfer the article P from the roller 31 toward the roller 35. As a result, the article P will stop at the point R, while slipping on the rollers of the roller group B, continuing to turn about the point R on the roller C, thus assuming the position as shown in FIG. 13(d) and eventually the position as shown in FIG. 13(e), thus completing the directional change through an angle of 90°. Thereafter, the article will advance on and along the leading linear transfer portion, with or without being driven, to a desired location.

An article completes its turning motion through an angle of 45°, when said article is transferred from the trailing linear transfer portion through roller group A to the roller C as shown in FIG. 13(c), after which a further turning through an angle of 45° is effected when the article is transferred from the roller C to the roller group B, thus completing its turning through an angle of 90° eventually. In the same manner, the directional changes through desired angles may be achieved with the various arrangements as shown in FIGS. 2 to 10.

With examples as shown in FIGS. 2 to 10, the roller C is located at an angle of 45° to the rollers of the roller group A or B, and thus the total angular change, which is an integral number of times as large as 45°, can be achieved. Alternatively, the directional change of article through any other angle can be obtained by suitablly selecting the ratio of varation in length of rollers of the roller group A or B and by employing one or more elementary combination as shown in FIG. 1.

As is apparent from the foregoing description, the conveyor according to the present invention can prevent the stagnation of articles on the curved transfer route of the conveyor, while enabling the transfer of an article, including the directional change, in a common level plane. It follows that the conveyor of the present invention permits efficient utilization of spaces without a need for adjustment of roller arrangement which results from varying properties and weights of articles to be transferred, like the conventional conveyor.

It will be recognized that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follows.

What is claimed is:

1. A conveyor for use in changing the direction of an article being transferred thereon, comprising:
   a first linear transfer portion adapted to linearly transfer said article and having a plurality of parallel rollers;
   a direction changing portion located adjacent to said first linear transfer portion to change the direction of said article; and
   a second linear transfer portion located adjacent to said direction changing portion to linearly transfer said article which has been turned angularly on said direction changing portion and having a plurality of parallel rollers;
   said direction changing portion including at least one combination of a first group of a plurality of parallel rollers located parallel to and adjacent the rollers of said first transfer portion; said plurality of rollers having different lengths which gradually decrease in an article-transferring direction of said first linear transfer portion and a single separate roller extending adjacent to and along the line formed with the ends, on one side, of said group of a plurality of parallel rollers, said line being formed at a given angle to the rollers of said group of a plurality of rollers and said direction changing portion further included a second group of a plurality of parallel rollers located at a given angle but adjacent to said single separate roller and having different lengths which gradually increase in an article-transferring direction of said second linear transfer portion each roller in said direction changing portion being operatively connected to a drive means.

2. A conveyor as set forth in claim 1 including in said direction changing portion;
   a third group of a plurality of rollers located at a given angle but adjacent to said second group of a plurality of rollers, said third group of a plurality of rollers having different lengths which gradually decrease in an article-transferring direction;
   a second single separate roller extending adjacent to and along the line formed with the ends, on one side, of said third group of a plurality of rollers;
   a fourth group of a plurality of rollers located at a given angle and but adjacent to said second single separate roller and having different lengths gradually increasing in an article-transferring direction of said second linear transfer portion.

3. A conveyor for use in changing the direction of an article being transferred thereon, comprising:
   a first linear transfer portion adapted to linearly transfer said article and having a plurality of parallel rollers;
   a direction changing portion located adjacent to said first linear transfer portion to change the direction of said article; and
   a second linear transfer portion located adjacent to said direction changing portion to linearly transfer said article which has been turned angularly on said direction changing portion and having a plurality of parallel rollers;
   said direction changing portion including;
   a first group of a plurality of parallel rollers located parallel to and adjacent the rollers of said first transfer portion having different lengths which gradually decrease in an article-transferring direction of said first linear transfer portion;
   a first single separate roller extending adjacent to and along the line formed with the ends, on one side, of said first group of a plurality of rollers, said line being formed at a given angle to the rollers of said first group;
   a second group of a plurality of parallel rollers located at a given angle but adjacent to said first single separate roller and having different lengths which gradually decrease in an article-transferring direction of said first separate roller;
   a second single separate roller extending adjacent to and along the line formed with the ends on one side of said second group of rollers;
   a third group of a plurality of parallel rollers with their axes substantially perpendicular to and adjacent said second single separate roller and having different lengths which gradually decrease in a direction substantially parallel to said second separate roller;
   each roller in said direction changing portion being operatively connected to a drive means.

4. A conveyor for use in changing the direction of an article being transferred thereon, comprising:
   a first linear transfer portion adapted to linearly transfer said article and having a plurality of parallel rollers;
   a direction changing portion located adjacent to said first linear transfer portion to change the direction of said article; and
   a second linear transfer portion located adjacent to said direction changing portion to linearly transfer said article which has been turned angularly on said direction changing portion and having a plurality of parallel rollers;
   said direction changing portion including at least one combination of a first group of a plurality of rollers located parallel to and adjacent the rollers of said first transfer portion;
   said plurality of rollers having different lengths which gradually decrease in an article-transferring direction of said first linear transfer portion;
   a first single separate roller extending adjacent to and along the line formed with the ends, on one side, of said first group of plurality of rollers, said line being formed at a given angle to the rollers of said first group of a plurality of rollers;
   a second group of a plurality of parallel rollers located at a given angle but adjacent to said first single separate roller and having different lengths which gradually decrease in an article-transferring direction of said first single separate roller;
   a second single separate roller extending adjacent to and along the line formed with the ends, on one side, of said second group of a plurality of rollers, said line being formed at a given angle to the rollers of said second group of a plurality of rollers; and a third group of a plurality of parallel rollers located at a given angle but adjacent to said second single separate roller and having different lengths which gradually increase in an article-transferring direction of said second linear transfer portion;

each roller in said direction changing portion being operatively connected to a drive means.

* * * * *